United States Patent [19]

Schimmelpfennig

[11] 4,447,375
[45] May 8, 1984

[54] METHOD OF CASTING A PRINTING HEAD FOR AN INK JET PRINTER

[75] Inventor: Hans Schimmelpfennig, Berlin, Fed. Rep. of Germany

[73] Assignee: Siemens Aktiengesellschaft, Berlin & Munich, Fed. Rep. of Germany

[21] Appl. No.: 512,731

[22] Filed: Jul. 11, 1983

[30] Foreign Application Priority Data

Jul. 15, 1982 [DE] Fed. Rep. of Germany ....... 3226746

[51] Int. Cl.³ .............................................. B29D 3/00
[52] U.S. Cl. ................................... 264/40.5; 264/275
[58] Field of Search ...................... 264/40.2, 40.5, 275; 356/375, 400; 250/561

[56] References Cited

U.S. PATENT DOCUMENTS 4,071,297  1/1978  Leitz et al. ........................... 356/375
4,286,201  8/1981  Roecks et al. ....................... 356/400

OTHER PUBLICATIONS

Siemens Magazine, vol. 51 (1977), No. 4, pp. 219–221.

*Primary Examiner*—Thomas P. Pavelko
*Assistant Examiner*—V. Fischbach
*Attorney, Agent, or Firm*—Hill, Van Santen, Steadman & Simpson

[57] ABSTRACT

A method for casting the print head of an ink jet printer employs a lost mold open at two opposite sides, one side being covered by transparent film onto which mold needles are lowered by means of a micro manipulator. The tips of the mold needles are imaged onto photodetectors, which furnishes signals for controlling operation of a micro manipulator for accurately positioning the tips of the mold needles. After the mold needles are inserted in position, the mold is filled with liquid synthetic material which, on hardening, forms the print head with micro channel ink conduits correctly defined by the positions of the mold needles.

7 Claims, 1 Drawing Figure

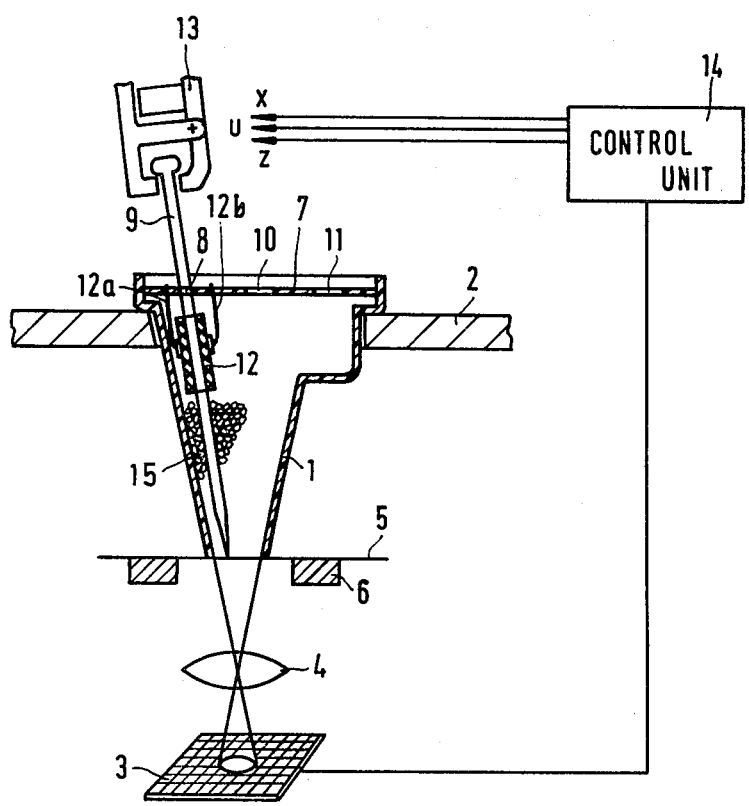

METHOD OF CASTING A PRINTING HEAD FOR AN INK JET PRINTER

BACKGROUND

1. Field of the Invention

The present invention relates to a method of casting a synthetic body and more particularly to a method of casting a write head for an ink jet printer having micro channels extending therethrough.

2. Prior Art

Ink jet printers employ write heads having micro channels extending through the head and terminating at nozzles, from which the ink emerges during printing as a jet or as individual droplets. Depending on the type of pressure with which the ink is supplied to the nozzle, such printing heads are characterized as operating at high-pressure, low-pressure, or under-pressure. When the high and low-pressure methods are employed, only a single nozzle is employed and the jet which emerges from the nozzle is electrostatically or magnetically deflected for formation of a character. When the under-pressure method is employed, a pressure less than atmospheric is normally maintained at the nozzle.

When an ink droplet is to be ejected, the pressure in the nozzle is briefly increased by means of a shock wave. Because the end of the nozzles remain unwetted in the under-pressure method, many nozzles can be disposed in tight proximity so that a deflection of the ink droplets becomes superfluous. For example, the nozzle openings may be arranged in two opposite rows of six openings each. All characters can be formed by selective excitation of the individual nozzles, i.e., ink droplets being ejected from selected nozzles at any given time.

In the past, the synthetic print head body with the micro channels employed with the under-pressure method, has been manufactured by means of casting or injection molding, with mold needles corresponding to the micro channels positioned such that their points are disposed in an arrangement corresponding to the grid of the nozzle openings. This needle arrangement is maintained, for example, by means of positive-lock centering of the needles in a metal sub-mold. Since the sub-mold accepts the frontal plane of the discharge openings of the micro channels, the position or attitude of the mold needles cannot be observed or measured, and automation of the molding operation becomes greatly impeded.

In addition, the previous method required is of a complicated displacement casting method, with a special casting mold which required substantial maintenance and cleaning.

It is therefore desirable to provide a method in which the molding of the print head can be automated, and in which precise positioning of the mold needles can be verified while at the same time maintaining favorable conditions for casting.

BRIEF SUMMARY OF THE INVENTION

A principal object of the present invention is to provide a method for recognizing and controlling the position of the mold needles prior to casting.

This object is attained by employing a so-called lost casting mold which is open at two sides, in conjunction with a transparent film covering one of the open sides. The print head may then be cast by simply filling the mold with a synthetic liquid, instead of the more complicated casting method and mold formally employed.

In a further development of the invention, excitation apparatus for each micro channel is molded in place during the formation of the write head by employing a terminal plate at one open side of the mold supporting a tubular element below each of a plurality of bores, such element having an inner diameter matched to the diameter of the mold needles. This allows the automatic alignment and orientation of the elements during the molding process.

These and other objects and advantages of the present invention will become manifest by inspection of the following description and the accompanying drawings.

BRIEF DESCRIPTION OF THE DRAWING

Reference will now be made to the drawing, which is a vertical cross-sectional view of apparatus used in an illustrative embodiment of the present invention.

DESCRIPTION OF THE PREFERRED EMBODIMENT

In the present invention a plurality of casting molds 1 are supported in alignment in a retaining plate 2. The drawing shows only a single casting mold 1, but it will be understood that the other casting molds are identical. During casting operations, the molds are moved successively to the casting station illustrated in the drawing, where alignment of the needles and casting takes place. This is accomplished by moving the retaining plate 2, which carries the molds.

The retaining plate 2 is conducted along a path past a photodiode matrix 3 associated with an optical system 4. The optical system 4 functions to image the plane of the bottom of the casting mold 1 on the surface of the photodiode matrix 3. The bottom end of the casting mold 1 is terminated by a transparent adhesive film 5 coated with adhesive on its upper film 5 being fixed by means of a stationary mounting ring 6. At its upper end, the casting mold 1 is covered by a terminal plate 7, which has two openings 10 and 11 for admitting liquid synthetic material during molding, and for letting the air escape from the mold during casting. In addition, one or more openings 8 is provided for acceptance of mold needles 9. Although one needle 9 is shown, a plurality of needles are preferably employed, for example in a straight line normal to the plane of the paper. The needles may diverge at their upper ends, so that connections to the upper ends of the micro channels is facilitated. A tubular excitation element 12 is provided for each of the needles 9, and is supported below the bores 8 by means of wires 12a and 12b connected to the terminal plate 7. The wires 12a and 12b are adapted to be connected, via the terminal plate 7, to a source of actuating signals, so that the excitation element 12 is able to bring about ejection of droplets from the print head.

Because the mold needle has a reduced diameter at its front (or lower) end, the mold needle 9, upon being introduced longitudinally through the bore 8, easily enters the central bore through the tubular excitation element 12, thus, bringing about a centering of the element. The inner diameter of the element 12 is matched to the diameter of the needle 9, so that correct alignment of the element 12 with the micro-channel defined by the needle 9 is assured.

The mold needles 9 are introduced by means of a micro manipulator 13, which is schematically illustrated in the drawing. Its operation in positioning the needles 9 is controlled by a control unit 14, which contains a micro processor operative in response to signals developed by the photodiode matrix 3, indicative of the position of the lower ends of the needles 9. Because the bottom tips of the needles are imaged on the plane of the photodiode matrix 3, which is fixed in position relative to the casting mold 1 at the casting location, misalignment of one or more of the needles is recognized by its image on the plate of the photodiode matrix 3. A micro computer within the control unit 14 scans the photodiode matrix 3, recognizes incorrect images or patterns, and controls the micro manipulator 13 in order to bring the misplaced needle into correct positioning. After the needles 9 are positioned in their appropriate positions, they are pushed longitudinally into the adhesive film 5, so that the lower end of the needles is fixed in position relative to the casting mold. The micro manipulator may then be removed without danger of having the needle points move. The mold 1 is then filled with a synthetic resin through the opening 10, with air being exhausted through the opening 11. Preferably, a plurality of glass beads 15 are first introduced into the mold (through the opening 10), which beads serve as a filler prior to introduction of the synthetic resin. After hardening of the synthetic resin, the needles 9 are removed.

After the casting mold 1 has been filled, the retaining plate 2 is moved or indexed one step, bringing the next (empty) casting mold into the casting position, so that the operation can be repeated. A new set of needles 9 is inserted into the next casting mold by means of the micro manipulator 13, and in all of the respects the operation is identical to that described above.

If desired, the synthetic resign serving to form the print head can be preevacuated in order to remove air therefrom to the highest possible degree. Also, after the casting operation, the synthetic body resulting therefrom may be pressure-jelled, which likewise serves the purpose of removing air from the actual casting compound. The homogeneity of the print head is also enhanced by the providing of an ample opening 11 for the escape of air during casting.

The product which results from the present invention is a fully formed print head for an ink jet printer, which need only be positioned in place, and conduits connected to the micro channels defined during molding by the needles 9, and connecting a source of excitation signals to the wires 12a and 12b via the terminal plate 7. The formation of the terminal plate 7 integrally with the molded print head facilitates assembly of the unit during printer manufacture.

The optical lens system 4, interposed between the diode matrix 3 and the bottom of the mold 1, allows for optimum resolution. For example, the optical system 4 can project the image on the plane 3 in magnified form, so that great precision can be achieved in the imaging of the position of the needles, resulting in great precision in their positioning for casting.

The micro manipulator 13 may be any micro manipulator having a gripper with multiple degrees of freedom, which arrangements are well known in the field of one armed robots.

While the method of the present invention has been described above in connection with fixing the tips of the needles in position with reference to the film 5, alternatively, the tips of the needles may be secured in place relative to the film 5 by means of thermo-gluing. For example, the film 5 may be provided with a thermoplastic layer, which softens when contacted by the warm tips of the needles 9 and then hardens when the needles cool to maintain them in fixed position. The needles may be prewarmed before being inserted by the micro manipulator 13, or heated while in position within the casting mold 1. Such heating may be accomplished either by applying heat to the upper end of the needles outside the mold chamber 1, or by passing electric current through this part of the needle, or by induction heating methods. The control unit 14 monitors and corrects if necessary the position of the needle tips during cooling, so that no misalignment results from thermal effects.

It will be appreciated from the foregoing that the present invention provides a method for forming a print head for an ink jet printer which is particularly economical and effective, and which provides for a high degree of automation. It will be apparent that various additions and modifications may be made in the apparatus and method of the present invention without departing from the essential features of novelty thereof, which are intended to be defined and secured by the appended claims.

What is claimed is:

1. A method of casting a synthetic body forming a write head for an ink jet printer, said write head having micro channels connecting first and second different limiting surfaces thereof, the discharge openings of said micro channels on said first limiting surface having a smaller diameter and a closer spacing than on said second limiting surface; comprising the steps of; providing a casting mold having openings corresponding to said two surfaces, covering the opening corresponding to said one surface with a transparent film, covering the other said opening with a terminal plate having bores for accepting at least one mold needle into said casting mold, using a positioning tool for positioning said needles, optically scanning the tips of said needles for developing signals for controlling operation of said positioning tool, whereby the tips of said needles are correctly positioned relative to said one surface, fixing the points of the mold needles to the transparent film, and subsequently filling said mold with liquid synthetic casting material through at least one casting orifice in said terminal plate.

2. The method according to claim 1, including the steps of providing a tubular excitation element juxtaposed below said bore, the inside diameter of said excitation element being matched to the diameter of the mold needle inserted through said bore, whereby said element is aligned with a micro channel defined by said needle.

3. The method according to claim 2, including the step of providing a plurality of bores in said terminal plate, mounting a plurality of tubular excitation elements in association therewith, one such excitation element juxtaposed with each said bore, the inside diameter of each of said excitation elements being matched to the diameter of its respective mold needle.

4. The method according to claim 1 including the step of providing a plurality of photodetectors at a location spaced from said film, and imaging the points of said needles onto said matrix.

5. The method according to claim 1 including step of using a micro processor controlled micro manipulator as said positioning tool.

6. The method according to claim 1 including the step of pushing the points of said mold needles through the transparent film when they have reached their correct positions.

7. The method according to claim 1 including the step of providing at least one opening in said terminal plate for the escape of air during filling of the mold chamber.

* * * * *